(12) United States Patent
Maxson et al.

(10) Patent No.: US 8,656,456 B2
(45) Date of Patent: Feb. 18, 2014

(54) PRIVACY PREFERENCES MANAGEMENT SYSTEM

(75) Inventors: Derek Stephen Maxson, Twain Harte, CA (US); Zachariah James Wise, Sonora, CA (US)

(73) Assignee: Front Porch, Inc., Sonora, CA (US)

( * ) Notice: Subject to any disclaimer, the term of this patent is extended or adjusted under 35 U.S.C. 154(b) by 193 days.

(21) Appl. No.: 13/153,227

(22) Filed: Jun. 3, 2011

(65) Prior Publication Data

US 2012/0023547 A1    Jan. 26, 2012

Related U.S. Application Data

(60) Provisional application No. 61/366,751, filed on Jul. 22, 2010.

(51) Int. Cl.
*H04L 29/06*    (2006.01)

(52) U.S. Cl.
USPC .............................................. 726/1; 726/22

(58) Field of Classification Search
USPC ............................................................ 726/1
See application file for complete search history.

(56) References Cited

U.S. PATENT DOCUMENTS

| | | | |
|---|---|---|---|
| 6,374,237 B1 * | 4/2002 | Reese | 1/1 |
| 2002/0165773 A1 * | 11/2002 | Natsuno et al. | 705/14 |
| 2007/0233857 A1 | 10/2007 | Cheng et al. | |
| 2008/0304518 A1 | 12/2008 | Cheng et al. | |
| 2008/0306815 A1 | 12/2008 | Dykes et al. | |
| 2008/0306816 A1 | 12/2008 | Matthys et al. | |
| 2009/0055267 A1 * | 2/2009 | Roker | 705/14 |
| 2009/0055270 A1 | 2/2009 | Magdon-Ismail et al. | |
| 2009/0138427 A1 | 5/2009 | Kalavade | |
| 2009/0248680 A1 | 10/2009 | Kalavade | |
| 2009/0296567 A1 * | 12/2009 | Yasrebi et al. | 370/221 |
| 2010/0138370 A1 | 6/2010 | Wu et al. | |
| 2010/0154059 A1 | 6/2010 | McNamee et al. | |
| 2010/0161411 A1 | 6/2010 | Wu et al. | |
| 2010/0161795 A1 | 6/2010 | Deridder et al. | |

OTHER PUBLICATIONS

McGraw, "NebuAd Introduces Next-Generation Online Consumer Privacy Protections, Raising the Bar on Internet Privacy Protection Standards" Jul. 8, 2008.
Eckersley, "How Unique Is Your Web Browser?", PETS'10 Proceedings of the 10th international conference on Privacy enhancing technologies, Springer-Verlag Berlin, Heidelberg, Jul. 2010, pp. 1-19.

\* cited by examiner

*Primary Examiner* — Yogesh Paliwal
(74) *Attorney, Agent, or Firm* — Robroy R. Fawcett

(57) ABSTRACT

The disclosed invention resides in a system and method for managing and maintaining an internet user's privacy directives without the necessity to rely on one or more cookies to be retained by a user's browser.

30 Claims, 9 Drawing Sheets

FIG. 7A ⟵ 700

| User ID ⟵710 | Subscriber ID ⟵720 | IP Address ⟵730 | User Fingerprint ⟵740 |
|---|---|---|---|
| 00001 | AB0BCD01 | 69.75.127.45 | DFCD3453-BBEA788A |
| 00002 | AB0BCD01 | 69.75.127.45 | FFBD8254-E7BB34C2 |
| 00003 | 10DCB0BA | 70.101.49.202 | 23CABE91-AFBA6702 |
| 00004 | AB0BCD01 | 69.75.127.45 | CAB12376-2468ACEB |

FIG. 7B

| User ID ⟵710 | Subscriber ID ⟵720 | IP Address ⟵730 | User Fingerprint ⟵740 |
|---|---|---|---|
| 00001 | AB0BCD01 | 69.75.127.45 | CAB12376-2468ACEB |
| 00002 | AB0BCD01 | 69.75.127.45 | FFBD8254-E7BB34C2 |
| 00003 | 10DCB0BA | 70.101.49.202 | 23CABE91-AFBA6702 |

FIG. 8 ⟵ 800

| Consumer ID ⟵810 | Private ⟵820 | Demographic: Age ⟵830.1 | ... | Demographic: X ⟵830.x | Interest: Music ⟵840.1 | ... | Interest: X ⟵840.x |
|---|---|---|---|---|---|---|---|
| 00001 | FALSE | 25 | ... | 327 | 123 | ... | 834 |
| 00002 | FALSE | 29 | ... | 547 | 129 | ... | 122 |
| 00003 | TRUE | NULL | ... | NULL | NULL | ... | NULL |

PRIVACY PREFERENCES MANAGEMENT SYSTEM

CROSS-REFERENCE TO RELATED APPLICATIONS

This application claims the benefit of U.S. Provisional Application No. 61/366,751, filed Jul. 22, 2010, which application is incorporated herein by reference.

BACKGROUND OF THE INVENTION

1. Field of the Invention

The present invention relates to a method and apparatus for managing and assuring an internet user's privacy directives.

2. Description of the Prior Art and Related Information

Consumers read articles with titles such as "Watchdog group flunks Google on privacy practices," "Online Privacy Concerns Increase," or "Internet privacy gets Congress' attention," and wonder how to protect themselves. Surveys show a majority of Internet users are not comfortable with current uses of behavioral targeting online and many would block such tracking if possible. Cookies, which are the predominant method for the tracking of consumer behavior online, are a technology standard of the Internet Engineering Task Force (IETF) as a part of the Hypertext Transfer Protocol (HTTP). They enable data to be stored on the user's computer, managed by the web browser and sent to the appropriate web site when the web site is visited.

Advertising networks (such as DoubleClick and Advertising.com), Internet Content Providers (such as CNN.com and NBC.com), social networks (such as Facebook and Twitter), and search engines (such as Google and Yahoo) are among those parties which use cookies and other methods to record information about internet users for use in future advertising and content personalization. Users desiring to opt-out of these services often face significant hurdles in doing so. Hundreds of different advertising networks, millions of domains, and the inherent weaknesses of using cookies as a means of persisting user choice, further complicate these hurdles.

Many online advertising networks, portals, publishers, social networks, and e-commerce sites use cookies to identify users and, often, the preferences or targeting data related to individual users. These cookies have a tremendous value to the web browsing experience, allowing users to return to frequently visited sites where a cookie is used to remember the identity of the user without requiring a log in. However, since these cookies, and other similar technologies, such as flash cookies, DOM storage, browser fingerprinting and static IP address identification, allow an online advertiser to target the user, advertising networks provide opt-out capabilities.

Cookie churn is the term given to the rate at which a particular user removes one or more cookies from their computer. Users who employ anti-virus software such as Norton or anti-spyware software such as Yahoo's Toolbar remove many cookies regularly in order to provide themselves with a measure of online privacy. However, there are techniques for re-associating a user with a new cookie. Since most advertising networks, portals, publishers, and social networks use cookies as a means of storing the user's privacy preference, this problem of cookie churn is magnified because cookies not only store the information for targeting, but they also store the user's choice to opt out of the targeting. When the opt-out cookie is lost, the user becomes eligible to be targeted, thereby negating their prior privacy choices. There are several reasons that cookies may be lost, and many happen without the user being aware of the loss: 1) the purchase of a new network device, or reloading the operating system of an existing device; 2) the use of a new or updated web browser; 3) the use of a separate user profile on the same device to access the internet; 4) existing choice cookies are inadvertently deleted; 5) existing choice cookies are removed by a security program; or 6) the choice cookies expire. Most users are not aware that their privacy choices can be "forgotten" so easily.

Another frustration for internet users is the fact that there are hundreds of advertising networks, and many of these advertising networks do not presently provide a privacy choice mechanism to begin with. Even for those networks which do support a privacy choice mechanism, consenting users find themselves confused by what information has been collected and is being used by the advertising networks.

These means of handling consumer privacy and choice have been flawed since their very inception. Cookies are an inefficient method for storing information that must persist. Cookies were intended by RFC 2109 of the Hypertext Transfer Protocol (HTTP) to be "a way to create stateful sessions with HTTP requests and responses." In addition the authors of RFC 2109 caution against the long-term storage of cookies: "User agents [web browser software] should probably be cautious about using files to store cookies long-term."

Since cookies were designed for session-based access to Internet content and shopping carts, it is no wonder that the online privacy model using cookies is flawed and presents a false sense of online privacy to the user.

Accordingly, there exists a need to enable Internet users to manage their privacy for all their Internet devices without relying on cookies while preserving the ability for advertising networks to advertise profitably. The present invention satisfies these needs.

SUMMARY OF THE INVENTION

An aspect of the present invention resides in a system and method for managing and maintaining an internet user's privacy directives without the necessity to rely on one or more cookies to be retained by a user's browser. In the method, a privacy identification system, operated by a Network Service Provider (NSP) with the ability to manage all connecting devices including PCs, mobile devices and the emerging variety of Internet connected devices on that network. Participating advertising networks communicate with the privacy identification system to obtain an internet user's privacy directives. If the internet user has not registered with the privacy identification system, a response is sent back to the advertising network declaring that the user is ineligible for personalized advertising. If the user has registered with the system, then a response containing the user's privacy directives is sent back to the advertising network. An alternative embodiment of the privacy identification system sets internet users who have not registered with the system as eligible for personalized advertising by default.

In more detailed aspects of the invention, internet users navigate to a user interface to register their devices and set privacy directives for all participating advertising networks. One technique the privacy identification system uses for identification of unique browser instances is by fingerprinting using parameters passed from a web browser to a web server in the HTTP headers. The elements for fingerprinting may include fonts, plug-ins, language, time zone, and other elements found in the headers. One method for fingerprinting may be to checksum or hash the discovered elements to discover unique browser instances behind the Network Address Translation (NAT) device.

An additional aspect of the invention provides the ability for greater persistence of internet user privacy and choice. Because of the aforementioned problems with current consent management methods, an internet user's privacy directives can be easily compromised or forgotten. A problem with the fingerprinting method is the fact that unique fingerprints can change even based on small modifications to an internet user's client machine. These changes would include things such as web browser upgrades, new web browsers, or changes in the operating system version; any of these changes could alter the form of the user agent string, and therefore alter the unique fingerprint. Therefore, the present invention logs the cookie identifiers from all advertising networks to build a more accurate profile of a particular internet user. If a change in the user agent string occurs, the present invention looks for persisting unique cookie identifiers from advertising networks and compares them to previous records for users already in the system. If matches are found, records are merged together to build a more accurate and complete profile of the user's privacy preferences.

In further aspects of the invention, the user' privacy preferences are dynamically and persistently maintained by updating changes to the IP address of the user's registered devices. Participating network service providers dynamically notify the privacy identification system with changes to the user's network access properties. Most networks service providers distribute IP addresses using the Dynamic Host Configuration Protocol (DHCP), which is frequently unpredictable in the way that it assigns IP addresses to subscribers. Therefore, when new IP addresses are assigned to subscribers, the present invention receives records of those IP address assignments and updates the user tables accordingly.

BRIEF DESCRIPTION OF THE DRAWINGS

The aforementioned advantages of the present invention as well as traditional advantages thereof will be more clearly understood hereinafter as a result of a detailed description of the preferred embodiment of the invention when taken in conjunction with the following drawings wherein:

FIG. 7 depicts an exemplary user database table for the present invention.

FIG. 8 depicts an exemplary user preferences database table for the present invention.

DETAILED DESCRIPTION

Figure 1:
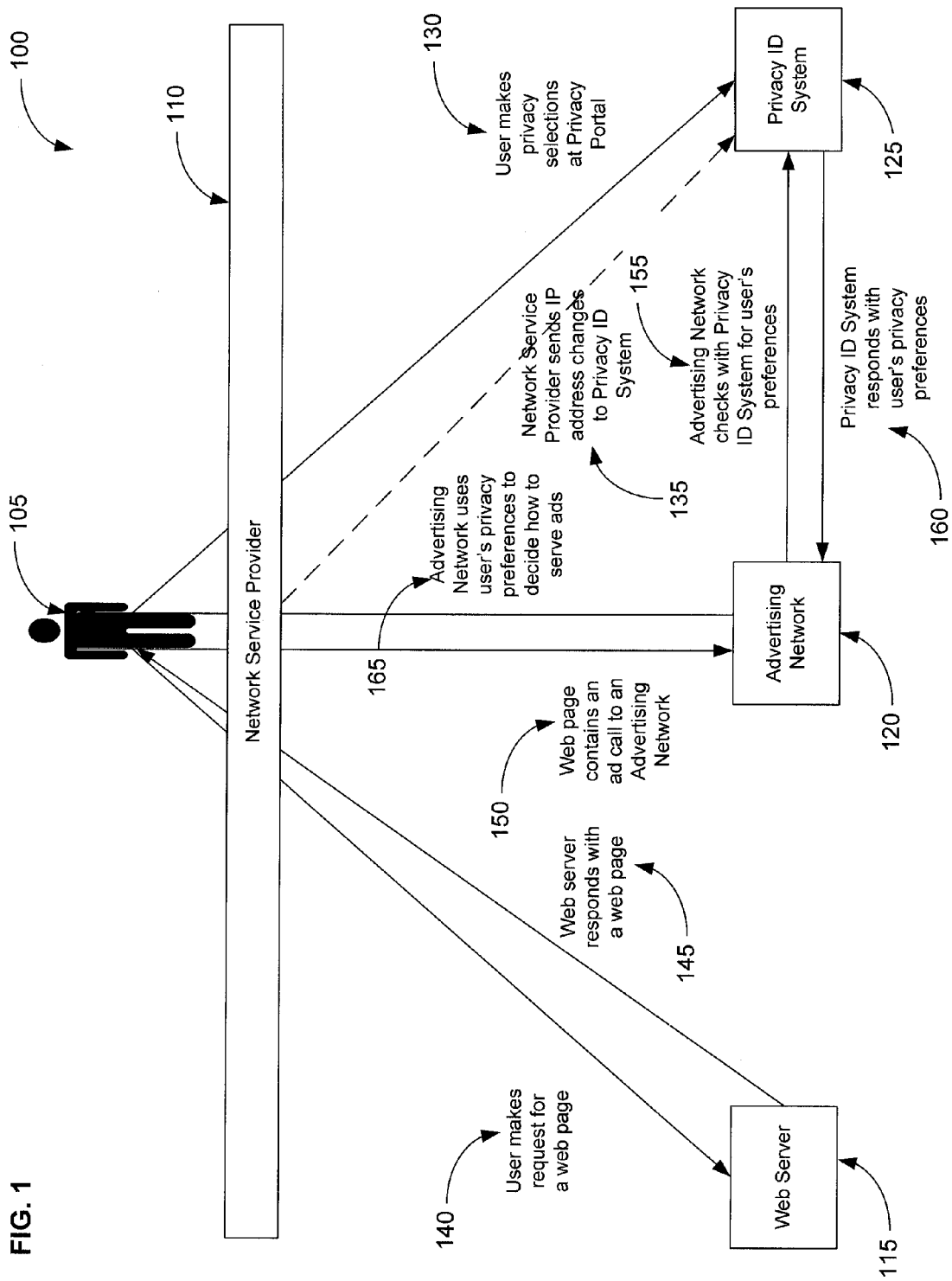
FIG. 1 is a system overview of the present invention

FIG. 1 depicts a diagram illustrating the system ecology 100 of the present invention wherein an internet user 105, a network service provider 110, a web server 115, and an advertising network 120 all interact with the privacy identification portion 125 of the present invention.

Figure 4:
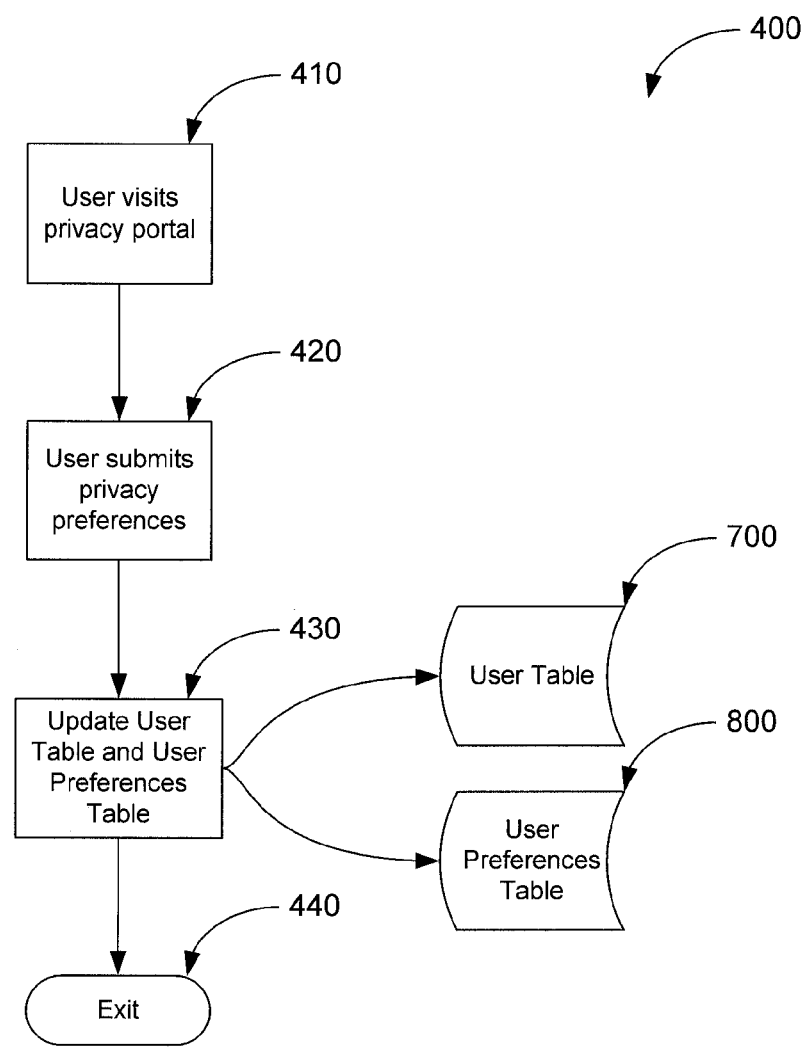
FIG. 4 depicts a flowchart illustrating the process by which an internet user manages his or her privacy preferences using the present invention.

At step 130, the internet user 105 navigates to the user interface side of the privacy identification system 125 as illustrated in process 400 of FIG. 4 where he or she makes privacy preference selections for participating advertising networks. This action by the internet user can occur at any time and is independent of any of the following steps. It is important to note that although the internet user does create a privacy preferences profile, this profile remains completely anonymous and is associated only with the devices that he or she uses.

Figure 5:
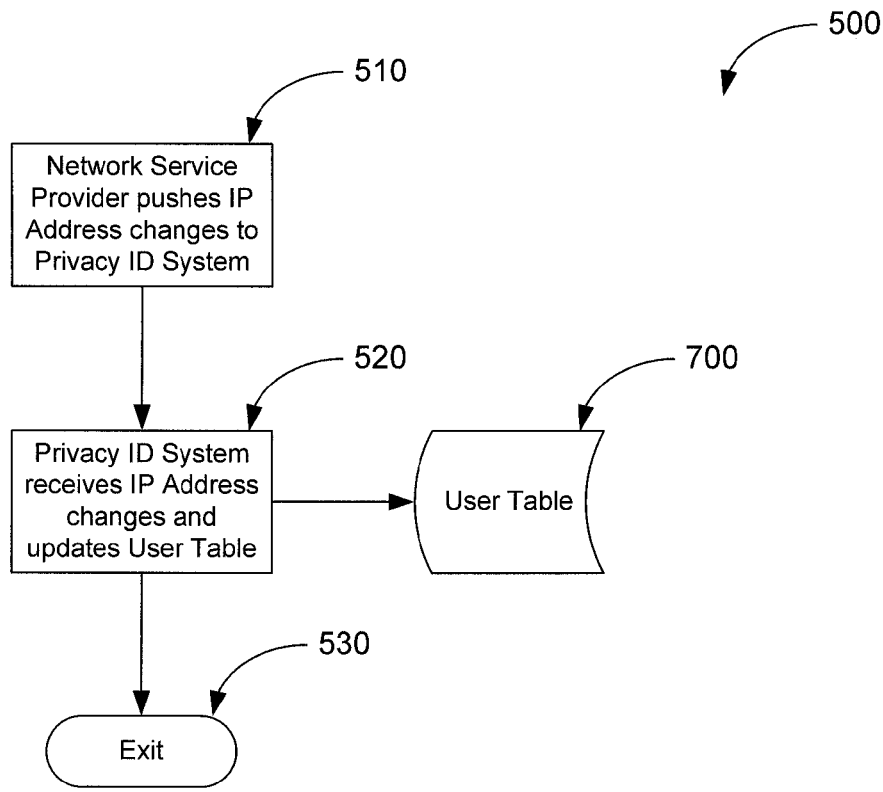
FIG. 5 depicts a flowchart illustrating the process of the network service provider updating the present invention with an internet user's current network information.

At step 135, the network service provider 110 notifies the privacy identification system 125 that a DHCP change has been made for a particular user's network access properties and that the user has a new IP address as in process 500 of FIG. 5. This action by the network service provider can occur at any time and is independent of all other steps.

At step 140, the internet user 105 makes an HTTP request for a page on a web server 115.

At step 145, the web server 115 sends an HTTP response for the requested web page with an embedded ad call to an advertising network 120.

At step 150, the internet user's client machine makes an HTTP request to the advertising network 120 in accordance with the ad call received in the previous step.

Figure 3:
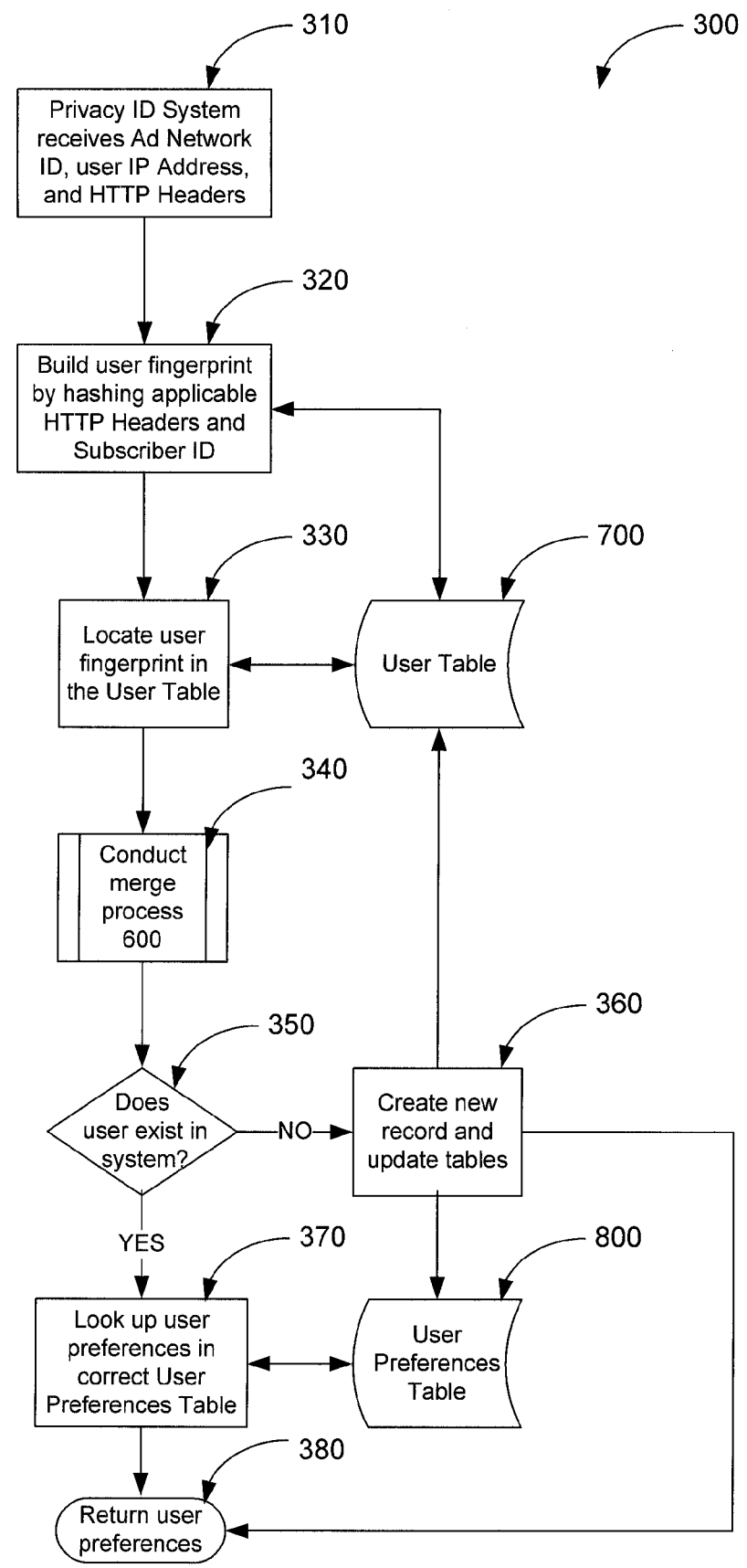
FIG. 3 depicts a flowchart illustrating the process of polling the records managed by the present invention to access an internet user's privacy preferences.

At step 155, the advertising network 120 communicates with the privacy identification system 125 as in process 300 of FIG. 3 to determine what privacy preferences are associated with the internet user 105.

At step 160, the privacy identification system 125 responds to the advertising network 120 with the privacy preferences of the internet user 105.

At step 165, the advertising network 120 decides how to use the privacy preferences returned in the previous step and serves an appropriate advertisement to the internet user 105.

Figure 2:
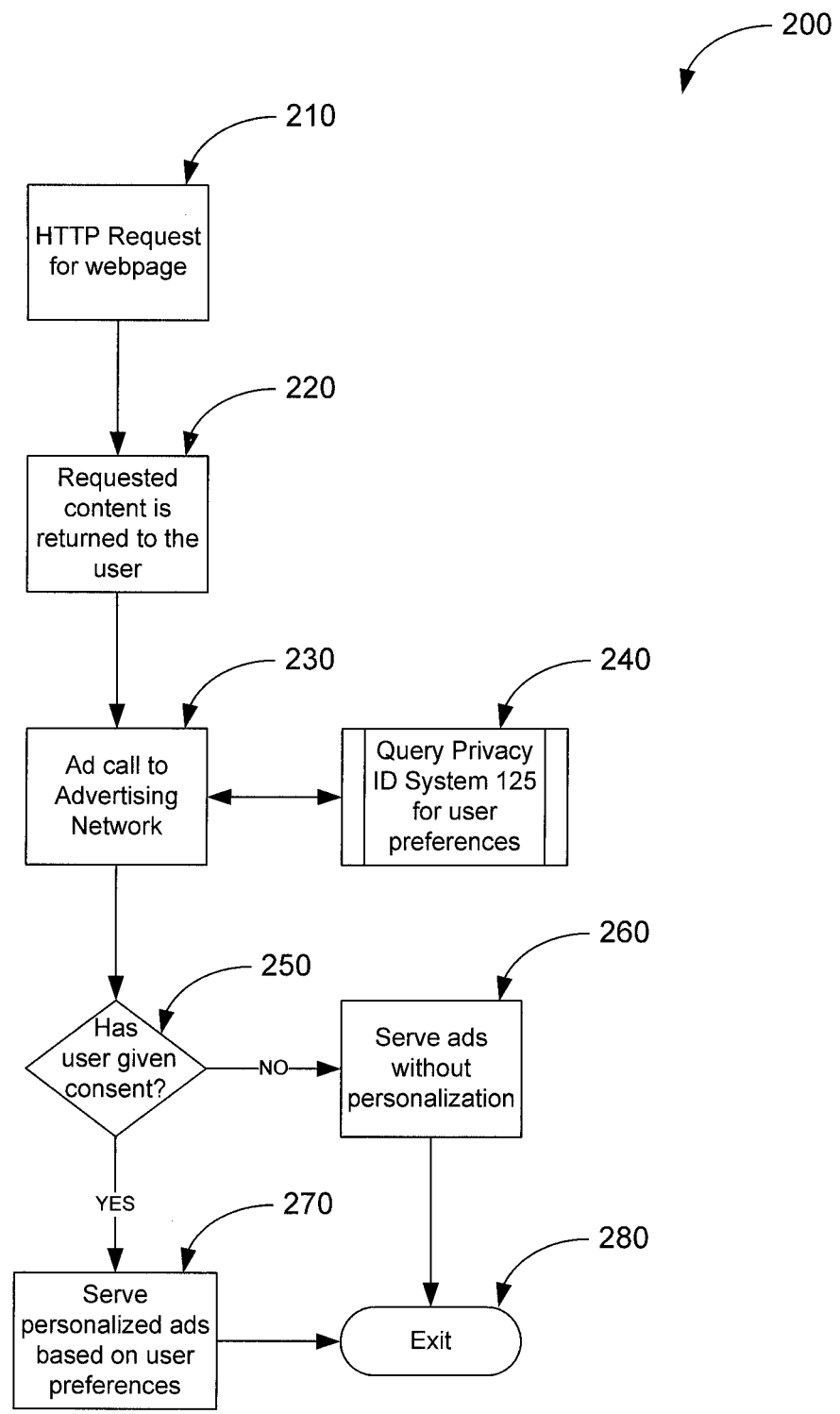
FIG. 2 depicts a flowchart illustrating the process of an advertising network interacting with the present invention.

FIG. 2 depicts a flowchart illustrating the system process 200 wherein the advertising network 120 decides how to handle an ad call from an internet user 105 after a request has been made for a web page.

At step 210, the internet user 105 makes an HTTP request for a web page on a web server 115.

At step 220, the web server 115 sends an HTTP response for the requested web page with an embedded ad call to an advertising network 120.

At step 230, the internet user's client machine makes an HTTP request to the advertising network 120 in accordance with the ad call received in the previous step.

At step 240, the advertising network 120 communicates with the privacy identification system 125 as in process 300 of FIG. 3 to determine what privacy preferences are associated with the internet user 105.

At step 250, if the internet user 105 has not given consent for personalized services the process moves to step 260. If the internet user 105 has given consent for personalized services, the process continues to step 270.

At step 260, the advertising network 120 delivers non-personalized content back to the internet user 105 in response to the ad call received in step 230.

At step 270, the advertising network 120 delivers personalized content, which is based on the preferences set by internet user 105, back to the client machine in response to the ad call sent in step 230.

At step 280, the process exits.

FIG. 3 depicts a flowchart illustrating the process 300 of querying the privacy identification system 125 for the privacy preferences associated with an internet user 105.

At step 310, the privacy identification system 125 receives a request 1000 from the advertising network 120. The request contains the IP address, user agent string, and cookie associated with internet user 105, as well as other HTTP headers related to the ad call.

At step 320, the privacy identification system 125 assembles the household Subscriber ID 720 from the user database table 700, user agent string, and other headers into a unique client fingerprint for the internet user 105.

At step 330, the privacy identification system 125 uses the client fingerprint constructed in the previous step to search for the record of the internet user 105.

At step 340, the merge process 600 runs to eliminate any duplicate records that may have been created.

At step 350, if the database does not contain a record of the internet user 105, the process moves to step 360. If the database does contain a record of the internet user 105, the process moves to step 370.

At step 360, the privacy identification system 125 creates a new user record in the user database table 700 for the internet user 105 using the fingerprint created in step 320. The system also creates new entries in the advertising network preferences database table 800 for all participating ad networks and sets the privacy preferences to disallow behavioral, demographic, or location-based targeting. The process then continues to step 380.

At step 370, the privacy identification system 125 queries the user preferences database table 800 for the privacy preferences of the internet user 105.

Figure 11A:
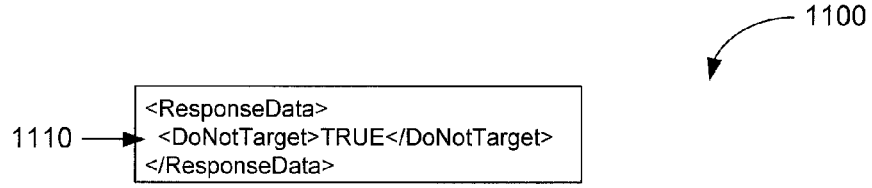
FIG. 11 depicts an exemplary XML transaction by which the present invention communicates an internet user's privacy preferences back to the advertising network.
Figure 11B:
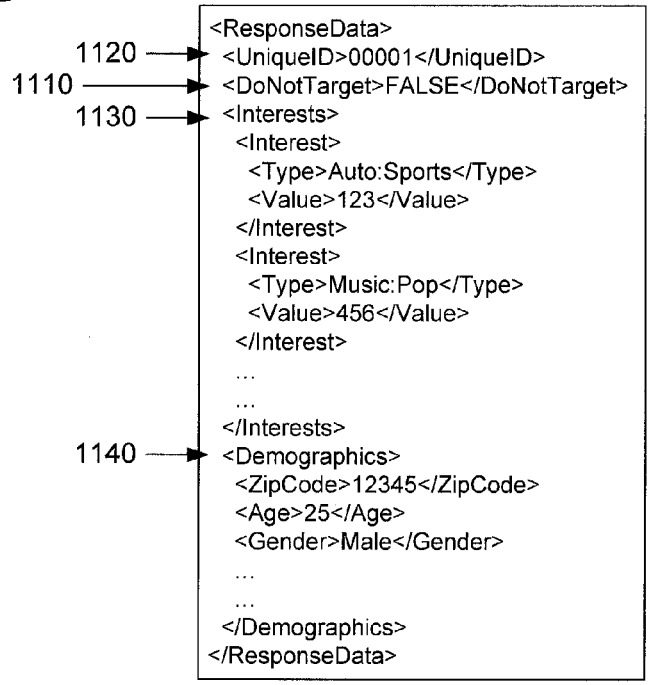

At step 380, the privacy preferences for the internet user 105 are returned to the requesting advertising network 120. If the internet user 105 has not consented to personalized services, the response to the requesting advertising network 120 is returned in the format of an XML response 1100 as seen in FIG. 11A, which contains only a node indicating that the user is not eligible for personalized services. If the internet user 105 has consented to personalized services, the response to the requesting advertising network 120 is returned in the format of an XML response 1100 as seen in FIG. 11B, which contains the User ID 710, a node indicating that the user is eligible for personalized services, and other information indicating the user's interests and demographic information.

FIG. 4 depicts the process 400 of an internet user 105 selecting privacy preferences using the user interface side of the privacy identification system 125. The internet user 105 may access the user interface at any time to modify privacy preferences.

At step 410, the internet user 105 navigates to the user interface of the privacy identification system 125.

At step 420, the internet user 105 makes privacy preference selections and submits them to the privacy identification system 125.

At step 430, the privacy identification system 125 updates the user database table 700 and the user preferences database table 800 with the modified privacy preferences.

At step 440, the process exits.

FIG. 5 depicts a flowchart illustrating the process 500 wherein the network service provider 110 notifies the privacy identification system 125 with changes to network access properties regarding an internet user 105.

At step 510, the network service provider 110 pushes modified network properties regarding an internet user 105 from the radius server, DHCP server, policy system, or other device which delivers IP address assignments to the privacy identification system 125.

At step 520, the privacy identification system 125 updates the user database table 700 with the new IP address of internet user 105.

At step 530, the process exits.

Figure 6:
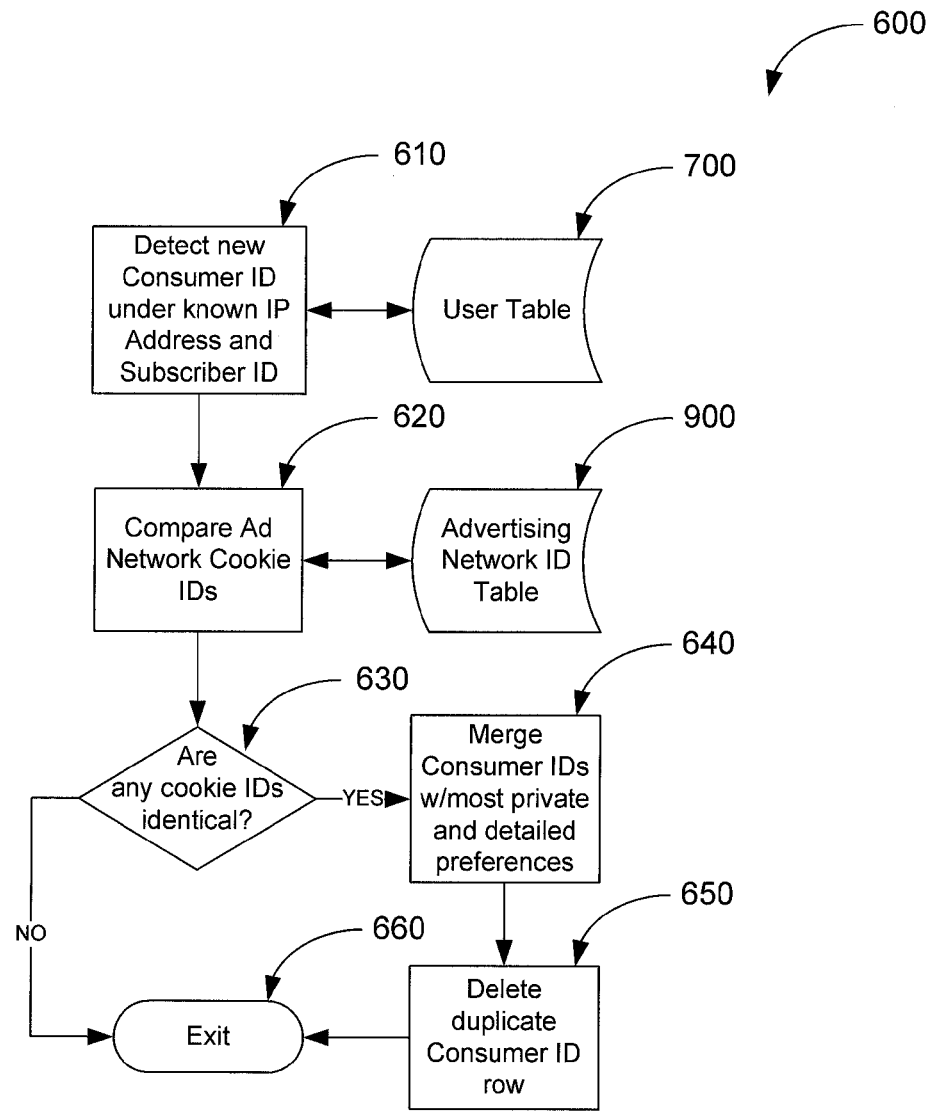
FIG. 6 depicts a flowchart illustrating the process of merging user preference profiles when a duplicate entry is detected.

FIG. 6 depicts a flowchart illustrating the process 600 wherein the privacy identification system 125 detects a duplicate user preferences entry and merges the two records into a single record.

At step 610, the privacy identification system 125 detects a duplicate entry in the user database table 700 where two rows have the same Subscriber ID 720 value and the same IP Address 730 value, but have different User IDs 710 and different User Fingerprints 740.

At step 620, the system compares the Ad Network Cookie Unique IDs 930 for the different User IDs 710 in the advertising network identification database table 900.

At step 630, if the any of the Ad Network Unique IDs 930 from any of the Ad Network ID entries for either User ID 710 are identical, the process moves on to step 640. If there is no match, then the process moves to step 660.

At step 640, the system merges the Consumer IDs in each of the databases. The system analyzes the privacy preferences, interests, and demographics of each of the duplicate entries and updates the respective fields to contain the most private and most detailed information from either of the duplicate entries.

At step 650, the system deletes the outdated duplicate Consumer ID entries from each of the databases so that only a single and accurate entry remains.

At step 660, the process exits.

FIG. 7 depicts an exemplary user database table 700 which stores data regarding internet users in accordance with the present invention.

The user table 700 (which runs on a computer system) has at least four fields: 1) an User ID field, 710, which uniquely identifies a given internet user 105 through the combination of the Subscriber ID field 720 and the User Fingerprint field 740; 2) a Subscriber ID field, 720, which uniquely identifies the subscriber ID associated with a given internet subscriber household; 3) an IP Address field, 730, which contains the current IP address for this particular user and device; and 4) an User Fingerprint field, 740, which is constructed by the privacy identification system 125 and contains a mash-up of the IP Address, user agent string of a particular device, and other HTTP header information for a given internet user 105. FIG. 7A depicts the table 700 before the merge process 600 has completed. FIG. 7B depicts the table 700 after the merge process 600 has completed.

FIG. 8 depicts an exemplary user preferences database table 800 which stores data regarding internet users' privacy preferences for participating advertising networks.

The user preferences table 800 (which runs on a computer system) has at least four fields: 1) an Consumer ID field, 810, which is the same as field 710 in the user table 700; 2) a Private field, 820, which contains a Boolean value describing whether or not the internet user 105 has agreed to receive personalized services; 3) a Demographics field, 830 (which may be comprised of many additional demographic fields 830.1-830.x), which describes the specific demographics of the internet user 105; and 4) an Interests field, 840 (which may be comprised of many additional interest fields 840.1-840.x), which describes the particular marketing-related interests of the internet user 105.

FIG. 9 depicts an exemplary network advertising identification database table 900 which stores choice information regarding particular advertising networks as they related to a given internet user 105.

Figure 9A:
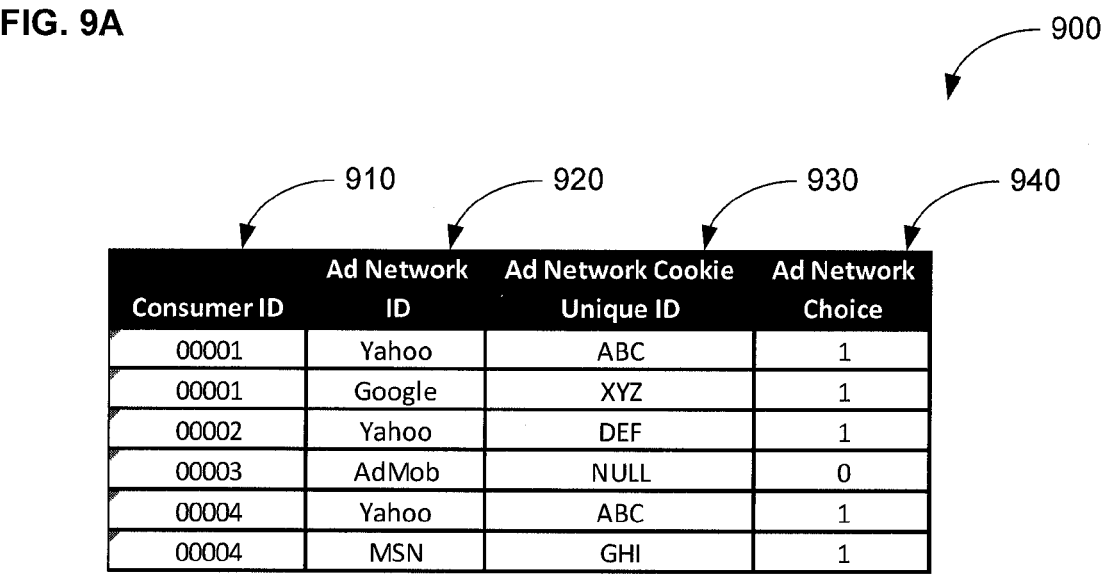
FIG. 9 depicts an exemplary advertising network identification database table for the present invention.
Figure 9B:
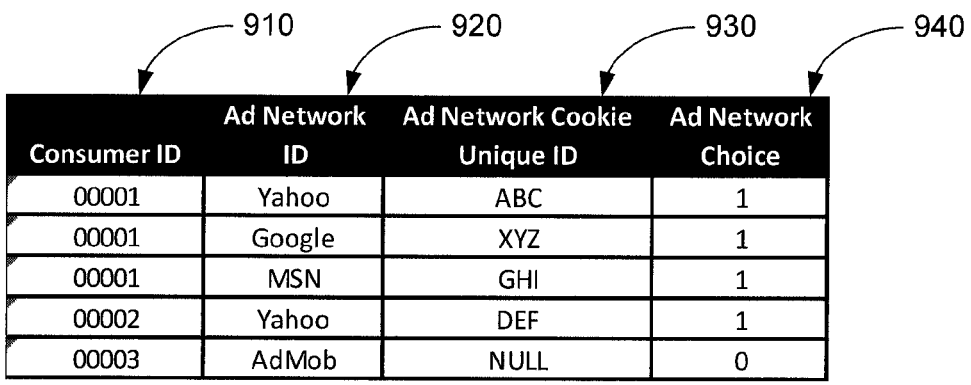

The advertising network identification table 900 (which runs on a computer system) has at least 4 fields: 1) an Consumer ID field, 910, which is the same as field 710 in the user table 700; 2) an Ad Network ID field, 920, which uniquely identifies individual advertising networks 120; 3) an Ad Network Cookie ID field, 930, which uniquely identifies a particular internet user 105 to advertising networks; and 4) an Ad Network Choice field, 940, which contains a value indicating whether or not an internet user 105 has consented to receive personalized services from a given advertising network 120. FIG. 9A depicts the advertising network identification table 900 before the merge process 600 has completed. FIG. 9B depicts the advertising identification table 900 after the merge process 600 has completed.

Figure 10:
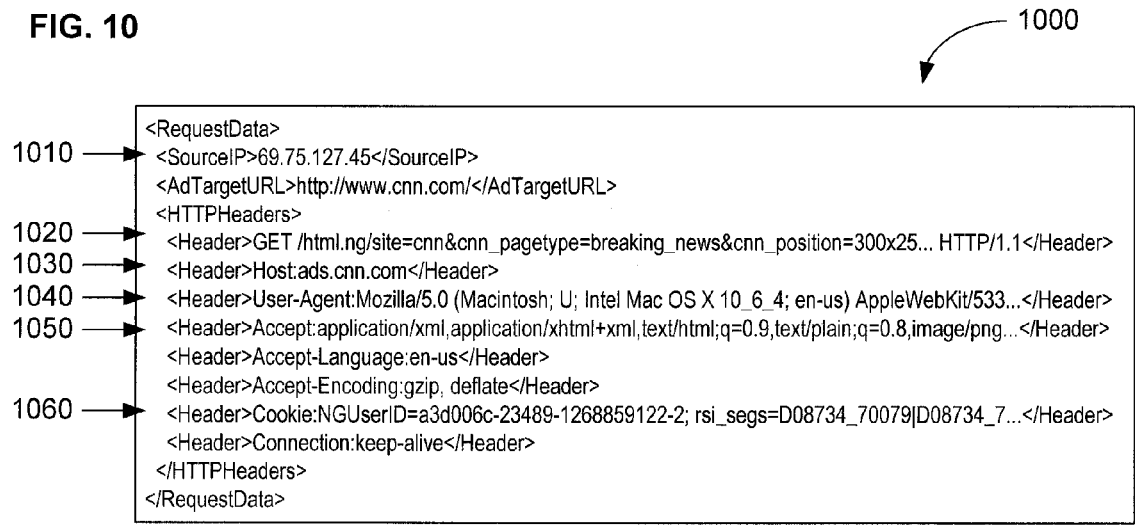
FIG. 10 depicts an exemplary XML (Extensible Markup Language) transaction by which the advertising network communicates with the present invention to obtain an internet user's privacy preferences.

FIG. 10 depicts an exemplary XML file or portion thereof 1000 which is used by the advertising network 120 to communicate a request for the privacy preferences of an internet user 105 to the privacy identification system 125.

The XML file contains at least 6 different data types: 1) a SourceIP node, 1010, which contains the IP address of the internet user 105 and is keyed to the IP address field 730 in the user table 700; 2) an HTTP GET request, 1020, which describes the requested content in the ad call; 3) a Host value, 1030, which is obtained from HTTP header information and is related to the Advertising Network ID 920 in the advertising network identification table 900; 4) a User-Agent string, 1040, which is obtained from the HTTP header information and is hashed into the User Fingerprint 740 in the user table 700; 5) an Accept value, 1050, which is obtained from the HTTP header information and is hashed into the User Fingerprint 740 in the user table 700; and 6) a Cookie, 1060, which is obtained from the HTTP header information and is keyed to the Ad Network Cookie Unique ID 930 in the advertising network identification table 900.

FIG. 11 depicts an exemplary XML transaction by which the present invention communicates an internet user's privacy preferences back to the advertising network.

FIG. 11A depicts an exemplary XML file or portion thereof 1100 which is used by the privacy identification system 125 to communicate the privacy preference of an internet user 105 to not receive personalized services back to the requesting advertising network 120. Node 1110 is the only piece of data sent back to the advertising network 120, with a value indicating that the user is not eligible for personalized services.

FIG. 11B depicts an exemplary XML file or portion thereof 1100 which is used by the privacy identification system 125 to communicate the privacy preferences of a consenting internet user 105 back to the requesting advertising network 120.

The XML file contains at least four different data nodes: 1) a DoNotTarget node, 1110, which indicates that the user is eligible for personalized services; 2) a UniqueID node, 1120, that carries the Consumer ID 710 from the user table 700 which identifies the user to the advertising network 120; 3) an Interests node, 1130, which contains the interests of the internet user 105 relevant to advertising; and 4) a Demographics node, 1140, which contains the demographic profile of an internet user 105

Figure 12:
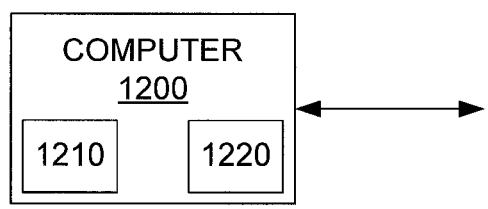
FIG. 12 depicts an exemplary computer for performing the process(es) of the invention.

FIG. 12 depicts a computer 1200 having means, such as a processor 1210, for performing the method steps/process(es) of the invention. A computer program product comprises a computer readable medium, such as a memory 1220, that stores code for causing the computer to perform the method of the invention.

What is claims is:

1. A method for privacy preference management, comprising:
a privacy identification system generating, for an internet user client, a unique client fingerprint value using client HTTP header information received from the internet user client, and
using client-unique NSP information used by a network service provider that provides internet service to the internet user client;
the privacy identification system maintaining at least one privacy preference for the internet user client, in association with the unique client fingerprint value;
the privacy identification system receiving, from an advertising network, a request for at least one privacy preference for an internet user client that generates an advertising call, wherein the request includes a source IP address and advertising call HTTP header information from the advertising call;
the privacy identification system matching the source IP address with a client IP address to determine the client-unique NSP information, wherein the client IP address is associated with the client-unique NSP information;
the privacy identification system generating an advertising call client fingerprint value using the determined client-unique NSP information, and using the advertising call HTTP header information included in the request;
the privacy identification system matching the advertising call client fingerprint value to the unique client fingerprint value to determine at least one privacy preference for the advertising call generating internet user client; and
the privacy identification system forwarding, to the advertising network, the determined at least one privacy preference.

2. The method for privacy preference management as defined in claim 1, wherein the privacy identification system receives, for the internet user client, an updated IP address from a network service provider when the client IP address of the internet user client changes, such that the client IP address associated with the client-unique NSP information is updated with the updated IP address.

3. The method for privacy preference management as defined in claim 1, wherein client-unique NSP information comprises a subscriber identifier.

4. The method for privacy preference management as defined in claim 1, wherein:
client HTTP header information comprises a user agent string; and
advertising call HTTP header information comprises a user agent string.

5. The method for privacy preference management as defined in claim 4, wherein:
client HTTP header information further comprises at least one accept value; and
advertising call HTTP header information further comprises at least one accept value.

6. The method for privacy preference management as defined in claim 1, wherein:
client HTTP header information comprises at least one accept value; and advertising call HTTP header information comprises at least one accept value.

7. The method for privacy preference management as defined in claim 1, wherein:
the unique client fingerprint value is formed from a hash of the client-unique NSP information and the client HTTP header information; and
the advertising call client fingerprint value is formed from a hash of the client-unique NSP information and the advertising call HTTP header information.

8. The method for privacy preference management as defined in claim 1, wherein:
the unique client fingerprint value is formed from a checksum of the client-unique NSP information and the client HTTP header information; and
the advertising call client fingerprint value is formed from a checksum of the client-unique NSP information and the advertising call HTTP header information.

9. The method for privacy preference management as defined in claim 1, wherein the at least one privacy preference comprises a consent value.

10. The method for privacy preference management as defined in claim 1, wherein the at least one privacy preference comprises an interest value.

11. The method for privacy preference management as defined in claim 1, wherein the at least one privacy preference comprises a demographic value.

12. An apparatus, comprising:
means for generating a unique client fingerprint value for an internet user client using client HTTP header information received from the internet user client, and using client-unique NSP information used by a network service provider that provides internet service to the internet user client;
means for maintaining at least one privacy preference for the internet user client, in association with the unique client fingerprint value;
means for receiving, from an advertising network, a request for at least one privacy preference for an internet user client that generates an advertising call, wherein the request includes a source IP address and advertising call HTTP header information from the advertising call;
means for matching the source IP address with a client IP address to determine the client-unique NSP information, wherein the client IP address is associated with the client-unique NSP information;
means for generating an advertising call client fingerprint value using the determined client-unique NSP information, and using the advertising call HTTP header information included in the request;
means for matching the advertising call client fingerprint value to the unique client fingerprint value to determine at least one privacy preference for the advertising call generating internet user client; and
means for forwarding, to the advertising network, the determined at least one privacy preference.

13. The apparatus as defined in claim 12, wherein client-unique NSP information comprises a subscriber identifier.

14. The apparatus as defined in claim 12, wherein:
client HTTP header information comprises a user agent string; and
advertising call HTTP header information comprises a user agent string.

15. The apparatus as defined in claim 12, wherein:
client HTTP header information comprises at least one accept value; and advertising call HTTP header information comprises at least one accept value.

16. The apparatus as defined in claim 12, wherein:
the unique client fingerprint value is formed from a hash of the client-unique NSP information and the client HTTP header information; and
the advertising call client fingerprint value is formed from a hash of the client-unique NSP information and the advertising call HTTP header information.

17. The apparatus as defined in claim 12, wherein:
the unique client fingerprint value is formed from a checksum of the client-unique NSP information and the client HTTP header information; and
the advertising call client fingerprint value is formed from a checksum of the client-unique NSP information and the advertising call HTTP header information.

18. The apparatus as defined in claim 12, wherein the at least one privacy preference comprises a consent value.

19. The apparatus as defined in claim 12, wherein the at least one privacy preference comprises an interest value.

20. The apparatus as defined in claim 12, wherein the at least one privacy preference comprises a demographic value.

21. An apparatus, comprising:
a memory; and
a processor, the processor configured to:
generate a unique client fingerprint value for an internet user client using client HTTP header information received from the internet user client, and using client-unique NSP information used by a network service provider that provides internet service to the internet user client;
maintain at least one privacy preference for the internet user client, in association with the unique client fingerprint value;
receive, from an advertising network, a request for at least one privacy preference for an internet user client that generates an advertising call, wherein the request includes a source IP address and advertising call HTTP header information from the advertising call;
match the source IP address with a client IP address to determine the client-unique NSP information, wherein the client IP address is associated with the client-unique NSP information;
generate an advertising call client fingerprint value using the determined client-unique NSP information, and using the advertising call HTTP header information included in the request;
match the advertising call client fingerprint value to the unique client fingerprint value to determine at least one privacy preference for the advertising call generating internet user client; and
forward, to the advertising network, the determined at least one privacy preference.

22. A computer program product, comprising:
non-transitory computer readable medium storing:
code for causing a computer to generate a unique client fingerprint value for an internet user client using client HTTP header information received from the internet user client, and using client-unique NSP information used by a network service provider that provides internet service to the internet user client;
code for causing a computer to maintain at least one privacy preference for the internet user client, in association with the unique client fingerprint value;
code for causing a computer to receive, from an advertising network, a request for at least one privacy preference for an internet user client that generates an advertising call, wherein the request includes a source IP address and advertising call HTTP header information from the advertising call;

code for causing a computer to match the source IP address with a client IP address associated with the client-unique NSP information to determine the associated client-unique NSP information;

code for causing a computer to generate an advertising call client fingerprint value using the determined associated client-unique NSP information, and using the advertising call HTTP header information included in the request;

code for causing a computer to match the advertising call client fingerprint value to the unique client fingerprint value to determine at least one privacy preference for the advertising call generating internet user client; and code for causing a computer to forward, to the advertising network, the determined at least one privacy preference.

23. The computer program product as defined in claim 22, wherein client-unique NSP information comprises a subscriber identifier.

24. The computer program product as defined in claim 22, wherein:

client HTTP header information comprises a user agent string; and advertising call HTTP header information comprises a user agent string.

25. The computer program product as defined in claim 22, wherein:

client HTTP header information comprises at least one accept value; and advertising call HTTP header information comprises at least one accept value.

26. The computer program product as defined in claim 22, wherein:

the unique client fingerprint value is formed from a hash of the client-unique NSP information and the client HTTP header information; and the advertising call client fingerprint value is formed from a hash of the client-unique NSP information and the advertising call HTTP header information.

27. The computer program product as defined in claim 22, wherein:

the unique client fingerprint value is formed from a checksum of the client-unique NSP information and the client HTTP header information; and the advertising call client fingerprint value is formed from a checksum of the client-unique NSP information and the advertising call HTTP header information.

28. The computer program product as defined in claim 22, wherein the at least one privacy preference comprises a consent value.

29. The computer program product as defined in claim 22, wherein the at least one privacy preference comprises an interest value.

30. The computer program product as defined in claim 22, wherein the at least one privacy preference comprises a demographic value.

* * * * *